US009998971B2

United States Patent
Koc et al.

(10) Patent No.: US 9,998,971 B2
(45) Date of Patent: Jun. 12, 2018

(54) EXTENDED DISCONTINUOUS RECEPTION (DRX) CYCLE LENGTH IN WIRELESS COMMUNICATION NETWORKS

(71) Applicant: Intel Corporation, Santa Clara, CA (US)

(72) Inventors: Ali Taha Koc, Portland, OR (US); Satish Chandra Jha, Hillsboro, OR (US); Maruti Gupta, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 14/127,621

(22) PCT Filed: Oct. 30, 2013

(86) PCT No.: PCT/US2013/067582
§ 371 (c)(1),
(2) Date: Dec. 19, 2013

(87) PCT Pub. No.: WO2014/070933
PCT Pub. Date: May 8, 2014

(65) Prior Publication Data
US 2014/0286215 A1 Sep. 25, 2014

Related U.S. Application Data

(60) Provisional application No. 61/721,436, filed on Nov. 1, 2012.

(51) Int. Cl.
*H04W 36/20* (2009.01)
*H04L 1/00* (2006.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
CPC ............. H04W 28/24; H04W 52/0235; H04W 76/046; H04W 8/005; H04W 52/0216
See application file for complete search history.

(56) References Cited

U.S. PATENT DOCUMENTS 7,965,651 B2 * 6/2011 Du ...................... H04W 76/048
370/252
8,072,963 B2 12/2011 Suzuki
(Continued)

FOREIGN PATENT DOCUMENTS

CN 104904137 A 9/2015
EP 2369883 A1 9/2011
(Continued)

OTHER PUBLICATIONS

"U.S. Appl. No. 14/126,611, Final Office Action dated May 22, 2015", 11 pgs.
(Continued)

*Primary Examiner* — Noel Beharry
*Assistant Examiner* — Ruihua Zhang
(74) *Attorney, Agent, or Firm* — Schwegman Lundberg & Woessner, P.A.

(57) ABSTRACT

Embodiments of wireless communication devices and method for discontinuous reception (DRX) mode in wireless communication are generally described herein. Some of these embodiments describe a wireless communication device having a module to cause the wireless communication device to enter the DRX mode in an operational state of the wireless communication device. The DRX mode may include a DRX cycle having a DRX cycle length. The DRX
(Continued)

cycle length may have a value greater than at least four values of DRX cycle lengths supported by an enhanced node-B.

26 Claims, 4 Drawing Sheets

(51) Int. Cl.

| | | |
|---|---|---|
| H04L 29/08 | (2006.01) | |
| H04W 28/24 | (2009.01) | |
| H04W 52/02 | (2009.01) | |
| H04W 24/08 | (2009.01) | |
| H04J 3/06 | (2006.01) | |
| H04L 5/00 | (2006.01) | |
| H04W 16/24 | (2009.01) | |
| H04W 8/00 | (2009.01) | |
| H04W 72/04 | (2009.01) | |
| H04W 76/02 | (2009.01) | |
| H04B 7/0417 | (2017.01) | |
| H04B 7/0452 | (2017.01) | |
| H04B 7/06 | (2006.01) | |
| H04W 28/02 | (2009.01) | |
| H04W 4/00 | (2018.01) | |
| H04W 76/04 | (2009.01) | |
| H04L 29/12 | (2006.01) | |
| H04W 16/20 | (2009.01) | |
| H04W 16/26 | (2009.01) | |
| H04W 60/04 | (2009.01) | |
| H04W 64/00 | (2009.01) | |
| H04W 36/14 | (2009.01) | |
| H04W 24/10 | (2009.01) | |
| H04W 72/06 | (2009.01) | |
| H04W 72/08 | (2009.01) | |
| H04W 36/30 | (2009.01) | |
| H04W 72/12 | (2009.01) | |
| H04W 24/04 | (2009.01) | |
| H04W 74/08 | (2009.01) | |
| H04J 11/00 | (2006.01) | |
| H04W 88/02 | (2009.01) | |
| H04W 88/08 | (2009.01) | |
| H04W 88/06 | (2009.01) | |
| H04W 88/16 | (2009.01) | |
| H04W 24/02 | (2009.01) | |

(52) U.S. Cl.
CPC .......... *H04B 7/0626* (2013.01); *H04J 3/0614* (2013.01); *H04J 11/00* (2013.01); *H04L 1/0027* (2013.01); *H04L 5/0046* (2013.01); *H04L 5/0048* (2013.01); *H04L 61/3005* (2013.01); *H04L 61/3075* (2013.01); *H04L 67/104* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 74/0858* (2013.01); *H04W 76/023* (2013.01); *H04W 76/046* (2013.01); *H04W 76/048* (2013.01); *H04J 11/0023* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/24* (2018.01); *Y02D 70/25* (2018.01); *Y02D 70/26* (2018.01); *Y02D 70/444* (2018.01)

(56) References Cited

U.S. PATENT DOCUMENTS

| | | | |
|---|---|---|---|
| 8,150,477 | B2 | 4/2012 | Cho et al. |
| 8,885,458 | B2 | 11/2014 | Diachina et al. |
| 9,100,160 | B2 | 8/2015 | Martinez Tarradell et al. |
| 9,225,399 | B2 | 12/2015 | Shan et al. |
| 9,225,759 | B2* | 12/2015 | Vannithamby ...... H04W 76/048 |
| 2001/0051994 | A1 | 12/2001 | Serizawa et al. |
| 2005/0032555 | A1 | 2/2005 | Jami et al. |
| 2005/0148348 | A1* | 7/2005 | Cramby ................ H04W 68/12 455/458 |
| 2005/0246080 | A1* | 11/2005 | Watkins ................... G07C 5/00 701/1 |
| 2007/0291673 | A1* | 12/2007 | Demirhan ......... H04W 52/0216 370/311 |
| 2008/0188247 | A1 | 8/2008 | Worrall |
| 2010/0272037 | A1* | 10/2010 | Lee ................... H04W 52/0235 370/329 |
| 2011/0038326 | A1 | 2/2011 | Davies et al. |
| 2011/0059744 | A1 | 3/2011 | Won et al. |
| 2011/0110347 | A1 | 5/2011 | Mun |
| 2011/0149728 | A1 | 6/2011 | Lee |
| 2011/0190000 | A1 | 8/2011 | Kwun |
| 2011/0294491 | A1* | 12/2011 | Fong ..................... H04L 5/001 455/422.1 |
| 2011/0310769 | A1 | 12/2011 | Lee et al. |
| 2011/0319065 | A1 | 12/2011 | Dalsgaard et al. |
| 2012/0052860 | A1 | 3/2012 | Faronius et al. |
| 2012/0155406 | A1 | 6/2012 | Kim et al. |
| 2012/0252518 | A1 | 10/2012 | Karampatsis et al. |
| 2012/0264483 | A1 | 10/2012 | Chin et al. |
| 2012/0300685 | A1* | 11/2012 | Kim .................... H04W 76/048 370/311 |
| 2013/0080597 | A1 | 3/2013 | Liao |
| 2013/0107778 | A1* | 5/2013 | Ryu ..................... H04W 48/02 370/311 |
| 2013/0196679 | A1 | 8/2013 | Widell et al. |
| 2013/0301558 | A1 | 11/2013 | Zakrzewski |
| 2013/0303206 | A1 | 11/2013 | Starsinic et al. |
| 2014/0016614 | A1 | 1/2014 | Velev et al. |
| 2014/0036795 | A1 | 2/2014 | Martinez Tarradell et al. |
| 2014/0092733 | A1 | 4/2014 | Johansson et al. |
| 2014/0094125 | A1 | 4/2014 | Behravan et al. |
| 2014/0113667 | A1 | 4/2014 | Keller et al. |
| 2014/0119261 | A1 | 5/2014 | Wang et al. |
| 2014/0269779 | A1 | 9/2014 | Shan et al. |
| 2015/0230234 | A1 | 8/2015 | Choi et al. |
| 2015/0245221 | A1 | 8/2015 | Yiu et al. |
| 2015/0271868 | A1* | 9/2015 | Rune .................... H04W 4/005 370/311 |
| 2016/0198406 | A1* | 7/2016 | Hoglund .............. H04W 48/08 370/311 |

(56) References Cited

U.S. PATENT DOCUMENTS

FOREIGN PATENT DOCUMENTS

| KR | 1020120094369 A | 8/2012 |
|---|---|---|
| KR | 1020120096408 A | 8/2012 |
| WO | WO-20120025825 | 3/2012 |
| WO | WO-2014070649 A1 | 5/2014 |
| WO | WO-2014070901 A1 | 5/2014 |
| WO | WO-2014070929 A1 | 5/2014 |
| WO | WO-2014070933 A1 | 5/2014 |

OTHER PUBLICATIONS

"U.S. Appl. No. 14/126,611, Response filed Jan. 23, 2015 to Non Final Office Action dated Oct. 23, 2014", 12 pgs.
"International Application Serial No. PCT/US2013/067043, International Preliminary Report on Patentability dated May 14, 2015", 8 pgs.
"International Application Serial No. PCT/US2013/067522, International Preliminary Report on Patentability dated May 14, 2015", 8 pgs.
"International Application Serial No. PCT/US2013/067575, International Preliminary Report on Patentability dated May 14, 2015", 8 pgs.
"International Application Serial No. PCT/US2013/067582, International Preliminary Report on Patentability dated May 14, 2015", 6 pgs.
"U.S. Appl. No. 14/126,611, Notice of Allowance dated Aug. 19, 2015", 12 pgs.
"U.S. Appl. No. 14/126,611, Response filed Jul. 24, 2015 to Final Office Action dated May 22, 2015", 9 pgs.
"U.S. Appl. No. 14/124,939, Preliminary Amendment filed Dec. 9, 2013", 9 pgs.
"U.S. Appl. No. 14/126,611, Preliminary Amendment filed Dec. 16, 2013", 11 pgs.
"Evaluation of MTC Device triggering", HTC, TD S2-110732, 3GPP TSG SA WG2 Meeting #83, (Feb. 2011), 2 pgs.
"International Application Serial No. PCT/US2013/067043, International Search Report dated Feb. 25, 2014", 4 pgs.
"International Application Serial No. PCT/US2013/067043, Written Opinion dated Feb. 25, 2014", 6 pgs.
"International Application Serial No. PCT/US2013/067522, International Search Report dated Feb. 12, 2014", 3 pgs.
"International Application Serial No. PCT/US2013/067522, Written Opinion dated Feb. 12, 2014", 6 pgs.
"International Application Serial No. PCT/US2013/067575, International Search Report dated Feb. 21, 2014", 3 pgs.
"International Application Serial No. PCT/US2013/067575, Written Opinion dated Feb. 21, 2014", 6 pgs.
"International Application Serial No. PCT/US2013/067582, International Search Report dated Nov. 27, 2013", 3 pgs.
"International Application Serial No. PCT/US2013/067582, Written Opinion dated Nov. 27, 2013", 4 pgs.
"Triggering a detached MTC device", InterDigital Communications, TD S2-110673, 3GPP TSG SA WG2 Meeting #83, (Feb. 2011), 4 pgs.
"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).
"U.S. Appl. No. 14/126,611, Non Final Office Action dated Oct. 23, 2014", 10 pgs.
"The Mobile Broadband Standard", 3GPP List of Work Items, [Online] retrieved from the internet: <http://www.3gpp.org/DynaReport/WI-List.html>.
"U.S. Appl. No. 14/124,939, Non Final Office Action dated Oct. 29, 2015", 31 pgs.
"European Application Serial No. 13850951.8, Extended European Search Report dated May 25, 2016", 9 pgs.
"European Application Serial No. 13850951.8, Communication pursuant to Article 94(3) EPCdated Apr. 10, 2014", 5 pgs.

* cited by examiner

EXTENDED DISCONTINUOUS RECEPTION (DRX) CYCLE LENGTH IN WIRELESS COMMUNICATION NETWORKS

PRIORITY APPLICATION

This application is a U.S. National Stage Application under 35 U.S.C. § 371 of International Application No. PCT/US2013/067582, filed Oct. 30, 2013, which application claims priority to U.S. Provisional Application Ser. No. 61/721436, filed Nov. 1, 2012, which applications are incorporated herein by reference in their entirety.

TECHNICAL FIELD

Embodiments pertain to wireless communications. Some embodiments relate to discontinuous reception (DRX) in wireless networks including those networks that operate in accordance to a 3GPP Evolved Universal Terrestrial Radio Access Network (E-UTRAN) Long-Term-Evolution (LTE-A) advanced network standard.

BACKGROUND

Power savings is an issue in wireless communication devices because most of these devices usually use a battery that has a limited energy storage capacity. In some conventional wireless communication networks, the device may enter a discontinuous reception (DRX) mode to save power when it does not actively communicate with other devices or with other entities in the network.

In the DRX mode, the device may operate under some DRX parameters. Conventionally, the values for DRX parameters to be used by a device in the DRX mode are determined by another entity in the network. Such an entity may include a base station, such as an enhanced node-B (eNB) in some 3GPP-LTE networks.

In some conventional techniques, the base station may determine the values for DRX parameters without some knowledge about the device, such as the type of the device or how often the device may communicate with the network. Thus, power savings involving DRX mode using some conventional techniques may be inefficient for some types of wireless communication devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
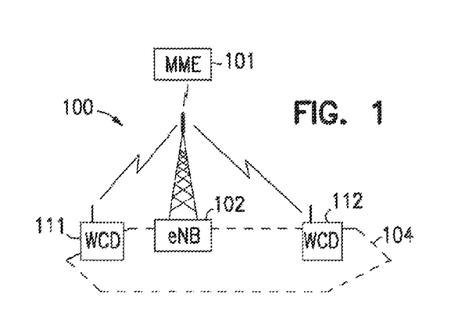
FIG. 1 shows a wireless communication network including a mobile management entity (MME), an enhanced Node-B (eNB), and wireless communication devices, according to some embodiments described herein.

FIG. 1 shows a wireless communication network 100, according to some embodiments described herein. Wireless communication network 100 may include a mobile management entity (MME) 101, a base station, such as an evolved or enhanced Node-B (eNB) 102, and wireless communication device (WCD) 111 and WCD 112. The eNB 102 and WCD 111 and 112 may operate to wirelessly communicate with each other in wireless communication network 100.

An example of wireless communication network 100 includes an evolved universal terrestrial radio access network (EUTRAN) using the 3rd Generation Partnership Project (3GPP) long term evolution (LTE) standards operating in time division duplex (TDD) mode. Another example of wireless communication network 100 includes a EUTRAN using the 3GPP-LTE standard operating in frequency division duplex (FDD) mode. Additional examples of wireless communication network 100 include Worldwide Interoperability for Microwave Access (WiMax) networks, 3rd generation (3G) networks, Wi-Fi networks, and other wireless data communication networks.

Examples of WCDs 111 and 112 include cellular telephones (e.g., smartphones), tablets, e-readers (e.g., e-book readers), laptops, desktops, personal computers, servers, personal digital assistants (PDAs), web appliances, set-top boxes (STBs), network routers, network switches, network bridges, parking meters, sensors, and other devices. Some devices (e.g., parking meters) among these example devices may be considered as delay tolerant devices, which may include machine-type communication (MTC) devices. An MTC device may not need user interaction to initiate communication with the network (e.g., wireless communication network 100). Some other devices (e.g., smartphones) among these example devices may be not be considered as delay tolerant devices (e.g., non-MTC devices). A non-MTC device (e.g., user equipment (UE) such as a smartphone) may need user interaction to initiate communication with the network (e.g., wireless communication network 100).

MME 101 may be a main control node for wireless communication network 100. MME 101 may be arranged (e.g., configured) to operate as a mobile management entity in accordance to the 3GPP-LTE standards. MME 101 may communicate with eNB 102 to track and send messages to WCDs 111 and 112. MME 101 may communicate with other WCDs besides WCD 111 and 112 through one or more other eNBs similar to, or identical to, the eNB 102.

The eNB 102 may operate as a serving eNB in a geographic area, such as cell 104 in wireless communication network 100. The eNB 102 may be arranged (e.g., configured) to operate as an enhanced Node-B in accordance to the 3GPP-LTE standards. FIG. 1 shows wireless communication network 100 including only one eNB (e.g., the eNB 102) as an example. Wireless communication network 100, however, may include multiple eNBs (e.g., multiple eNBs similar to, or identical to, the eNB 102). Each of the multiple eNBs may serve a particular cell in wireless communication network 100 and may or may not neighbor the eNB 102.

WCDs 111 and 112 may be served by the eNB 102 in cell 104. WCDs 111 and 112 may be arranged (e.g., configured) to operate in accordance to the 3GPP-LTE standards. FIG. 1 shows wireless communication network 100 including only two WCDs (e.g., WCDs 111 and 112) served by the eNB 102 in cell 104 as an example. Wireless communication network 100, however, may include more than two WCDs served by the eNB 102. The eNB 102 and each of WCDs 111 and 112 may operate to communicate with each other using an orthogonal frequency division multiple access (OFDMA) technique.

Each of WCDs 111 and 112 may operate to receive OFDMA communication signals over a multicarrier communication channel in accordance to an OFDMA technique. The OFDMA technique may be either a frequency domain duplexing (FDD) technique that uses different uplink and downlink spectrum or a time domain duplexing (TDD) technique that uses the same spectrum for uplink and downlink. The OFDMA communication signals may comprise orthogonal subcarriers.

Each of WCDs 111 and 112 may operate in different operational states. In one or more of these operational states, WCD 111 may enter a power saving mode to save power. For example, WCD 111 may enter a power saving mode after a specific amount of time of no active communication (e.g., no exchanging of data) between WCD 111 and the eNB 102. Similarly, WCD 112 may enter a power saving mode after a specific amount of time of no active communication (e.g., no exchanging of data) between WCD 112 and the eNB 102. An example of a power saving mode in WCDs 111 and 112 includes a discontinuous reception (DRX) mode, such as DRX mode in accordance to the 3GPP-LTE standards.

Figure 2:
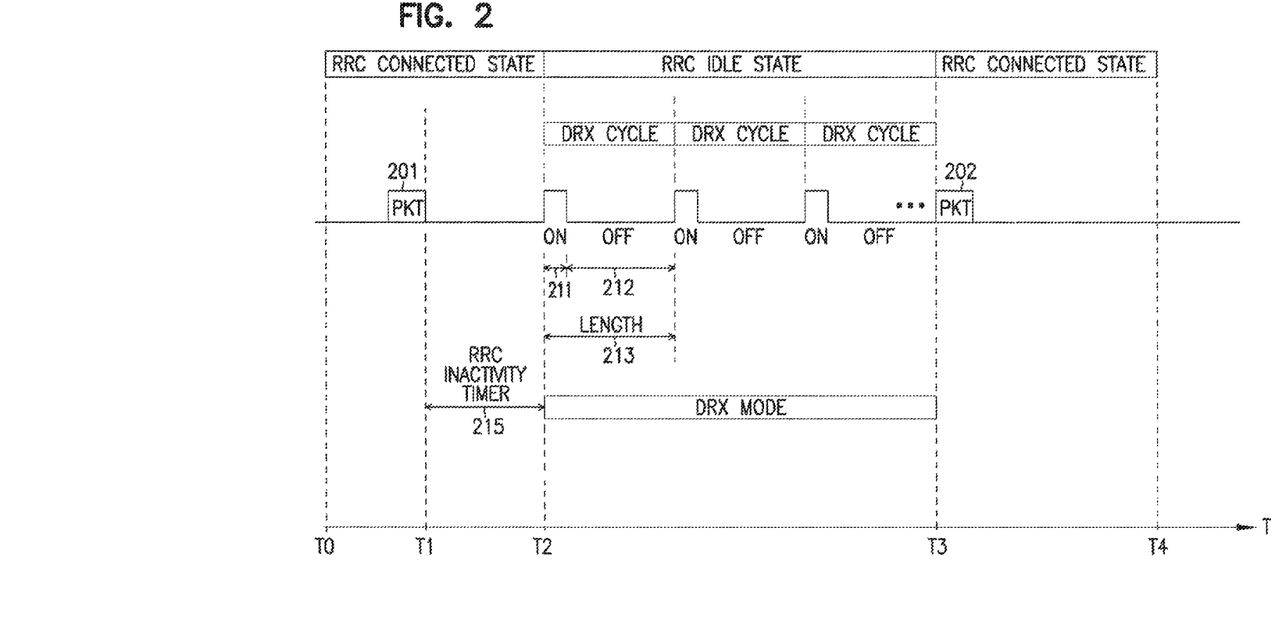
FIG. 2 is a timing diagram for some operational states and a discontinuous reception (DRX) mode of one of the wireless communication devices of FIG. 1, according to some embodiments described herein.

FIG. 2 is a timing diagram for some operational states and DRX mode of WCD 111 of FIG. 1, according to some embodiments described herein. Operational states and DRX mode of WCD 112 may be similar to, or identical to, those shown in FIG. 2.

As shown in FIG. 2, WCD 111 may operate in different operational states, such as radio resource control (RRC) connected state and RRC idle state. RRC connected state and RRC idle state in FIG. 2 may correspond to RRC_CONNECTED state and RRC_IDLE state, respectively, in accordance to the 3GPP-LTE standards.

FIG. 2 shows that RRC connected state may occur between times T0 and T2, and between times T3 and T4. In RRC connected state, the location of WCD 111 may be known to eNB 102. WCD 111 and the eNB 102 may maintain a communication link (e.g., radio connection) to communicate with each other. For example, in RRC connected state WCD 111 and the eNB 102 may exchange packet (PKT) 201 and packet 202 with each other. Packets 201 and 202 may represent data (e.g., data packet) or other information.

RRC idle state may occur between times T2 and T3. In RRC idle state, the location of WCD 111 may be unknown to eNB 102. For example, context of WCD 111 may be removed from eNB 102. In RRC idle state, a communication link may not be established between the WCD 111 and the eNB 102. No data packet (e.g., packet similar to packet 201 or 202) may be exchanged between WCD 111 and the eNB 102 in RRC idle state. The location of the WCD 111 in RRC idle mode, however, may be tracked by MME 101. MME 101 may send messages (e.g., paging messages) to WCD 111 to track its location and/or to establish (e.g., re-establish) a communication link with WCD 111. WCD 111 may exit RRC idle state (e.g., at time T3) and re-establish a communication link between WCD 111 and the eNB 102 in RRC connected state. For example, WCD 111 may exit RRC idle mode if WCD 111 detects a paging message (initiated by MME 101) during on-duration 211 and determines that the information in the paging message is intended for it. WCD 111 may remain in RRC idle state if WCD 111 detects a paging message during on-duration 211 and determines that the information in the paging message is not intended for it. WCD 111 may also remain in RRC idle state if it does not detect a paging message during on-duration 211.

In FIG. 2, packet 201 may represent the last packet communicated between WCD 111 and the eNB 102 during RRC connected state (e.g., between times T0 and T2) before RRC idle state. Packet 202 may represent the next packet (e.g., a data packet after packet 201) communicated between WCD 111 and the eNB 102 in another RRC connected state (e.g., between times T3 and T4) after RRC idle state.

In each of RRC connected state and RRC idle state, WCD 111 may enter (e.g., activate) DRX mode to reduce power consumption of WCD 111, thereby saving power. FIG. 2 shows DRX mode in RRC idle state (e.g., between times T2 and T3) as an example. WCD 111 may also enter DRX mode (e.g., between times T1 and T2) in RRC connected state. DRX mode in RRC connected state may be similar to, or identical to, that of DRX mode in RRC idle state shown in FIG. 2 and described in detail below.

The following description describes an example associated with DRX mode in RRC idle state for WCD 111. However, DRX mode in RRC idle state for WCD 112 may be similar to, or identical to, that of WCD 111.

As shown in FIG. 2, WCD 111 may enter DRX mode at time T2 if no information is communicated between WCD 111 and the eNB since time T1. Time T1 may correspond to a time at which the last information (e.g., packet 201) has been communicated between WCD 111 and the eNB 102. The amount of time between times T1 and T2 may be based on a DRX parameter value of a DRX parameter, such as RRC inactivity timer 215. The eNB 102 may determine (e.g., set) the value for RRC inactivity timer 215 based on particular information, such as operator power saving requirements for wireless communication devices (e.g., WCD 111 and 112), system backbone signaling load and congestion information, battery consumption target for wireless communication devices, and other information.

As shown in FIG. 2, DRX mode may include at least one DRX cycle. FIG. 2 shows three DRX cycles in the DRX mode as an example. The number of DRX cycles in DRX mode can vary. Each DRX cycle in FIG. 2 may correspond to a long DRX cycle in accordance to the 3GPP-LTE standards. Each DRX cycle may include DRX parameters, such as an on-duration 211 (a portion of a DRX cycle), an off-duration 212 (another portion of the DRX cycle), and DRX cycle length 213. DRX cycle length 213 may have a value of hundreds of milliseconds, thousands of millisecond, a minute, tens of minutes (e.g., 30 minutes), an hour, or another value of time. The eNB 102 may determine (e.g., set) the values for on-duration 211, an off-duration 212, and DRX cycle length 213 based on information (e.g., system capability) from wireless communication network 100. Alternatively (or additionally) the eNB 102 may determine the values for on-duration 211, off-duration 212, and DRX cycle length 213 based on device capability (e.g., additional information specified by WCD 111).

In DRX mode, WCD 111 may remain in an asleep stage during off-duration 212, such that most circuitry (e.g., radio receiver circuitry) in WCD 111 is turned off. WCD 111 may wake up during on-duration 211 to monitor control information on a particular channel. For example, during on-duration 211, WCD 111 may wake up and monitor frames of a control channel for downlink information (e.g., paging messages from MME 101) or other information initiated by wireless communication network 100. As an example, if WCD 111 and the eNB 102 are arranged to communicate with each other in accordance to the 3GPP-LTE standards, WCD 111 may wake up during on-duration 211 and monitor OFDMA frames of physical downlink control channel (PDCCH) in order to determine whether it is paged (e.g., by MME 101) by wireless communication network 100. During off-duration 212 of DRX cycle, WCD 111 may refrain from monitoring the control channel (e.g., does not monitor the control channel) in order to reduce power consumption. As an example, if WCD 111 and the eNB 102 are arranged to communicate with each other in accordance to the 3GPP-LTE standards, WCD 111 may refrain from monitoring (e.g., does not monitor) OFDMA frames of PDCCH during off-duration 212.

Power saving in WCD 111 may depend in part on the value (e.g., proportional to the value) of DRX cycle length 213. For example, a relatively greater value for DRX cycle length 213 for a given on-duration 211 may improve power savings in WCD 111. However, a greater value for DRX cycle length 213 may increase delay and re-establish a communication link between WCD 111 and the eNB (e.g., eNB 102) if control signals are present on the control channel while WCD 111 is in DRX mode. Thus, depending on the type and/or device capability of WCD 111, the eNB 102 and WCD 111 may communicate with each other to provide a balanced trade-off between reduced power consumption in WCD 111 and quality of service (QoS). For example, if WCD 111 is a delay tolerant device (e.g., an MTC device such as a parking meter), power savings may be preferable over delay (e.g., delay in accessing the network). Thus, in this example, WCD 111 may use DRX cycle length 213 having value (e.g., an extended value) greater than that (e.g., a non-extended value) used by a non-MTC device in order to achieve a higher reduction in power consumption (e.g., more power savings). In another example, if WCD 111 is a non-MTC device (e.g., a smartphone), quicker connection to the network may be more preferable than power savings. Therefore, in this example, WCD 111 may use DRX cycle length 213 having a value (e.g., non-extended value) less than that (e.g., an extended value) used by an MTC device in order to maintain or achieve good user experience (e.g., quick connectivity and/or quality of service).

The value of DRX cycle length 213 may be based on a DRX parameter value supported by (e.g., provided by) the eNB 102. The DRX parameter value supported by the eNB 102 may include a default DRX parameter value supported by the eNB 102.

The eNB 102 may be arranged (e.g., configured) to support a predetermined number (e.g., N) of different DRX parameter values $T_{C1}$ through $T_{CN}$ associated with DRX cycle length 213. DRX parameter values $T_{C1}$ through $T_{CN}$ may include default DRX parameter values supported by eNB 102. The eNB 102 may support a relatively larger number of DRX parameter values, such that eNB 102 may accommodate a relatively large number of corresponding DRX cycle lengths. As an example, the eNB 102 may support more than four (e.g., N>4) DRX parameter values (e.g., default DRX parameter values) associated with more than four values of DRX cycle lengths (default DRX cycle lengths).

Each of DRX parameter values $T_{C1}$ through $T_{CN}$ may be used to determine the value of a corresponding DRX cycle length 213 (that WCD 111 may use during DRX mode). For example, if the eNB 102 supports eight (e.g., N=8) DRX parameter values $T_{C1}$ through $T_{C8}$ ($T_{C1}$, $T_{C2}$, $T_{C3}$, $T_{C4}$, $T_{C5}$, $T_{C6}$, $T_{C7}$, and $T_{C8}$), then eight corresponding values for DRX cycle length 213 may be determined. The description herein uses eight DRX parameter values for DRX cycle length 213 as an example. The eNB 102 may support a different number of DRX parameter values for DRX cycle length 213. DRX parameter value $T_{CN}$ may be the maximum value (e.g., maximum default value) among DRX parameter values $T_{C1}$ through $T_{CN}$. Thus, a maximum value (e.g., maximum default value) of a DRX cycle length (e.g., DRX cycle length 213) supported by the eNB 102 may be determined based on a corresponding maximum DRX parameter value (e.g., $T_{CN}$) supported by the eNB 102.

Each of DRX parameter values supported by the eNB 102 may correspond to (e.g., be expressed by) the number of radio frames used in wireless communication network 100. For example, the eNB 102 may support DRX parameter value $T_{C1}$=32 radio frames, $T_{C2}$=64 radio frames, $T_{C3}$=128 radio frames, $T_{C4}$=256 radio frames, $T_{C5}$=W radio frames, and $T_{C6}$=X radio frames, $T_{C7}$=Y radio frames, $T_{C8}$=Z radio frames, where $T_{C1}<T_{C2}<T_{C3}<T_{C4}<T_{C5}<T_{C6}<T_{C7}<T_{C8}$. Thus, if $T_{C4}$ is not greater than 256, then each of values W, X, Y, and Z can be any number of radio frames greater than 256 where W<X<Y<Z. The duration of each of the radio frames may be millisecond range (e.g., 10 ms).

The value for DRX cycle length 213 may be determined based on one of the DRX parameter values (e.g., one of $T_{C1}$ through $T_{CN}$) supported by the eNB 102. For example, the value for DRX cycle length 213 may be calculated by multiplying the DRX parameter value by the duration (e.g., 10 ms) of each of the radio frames. As an example, if the duration of each radio frame is 10 ms, then the value for DRX cycle length 213 may be one of 320 ms, 640 ms, 1280 ms, 2560 ms, and W×10 ms, X×10 ms, Y×10 ms, and Z×10 ms if DRX parameter values $T_{C1}$ through $T_{C8}$ are 32, 64, 128, 256, and W, X, Y, and Z, respectively. Thus, depending on DRX parameter values $T_{C1}$ through $T_{CN}$, the value for DRX cycle length 213 may be greater than 2560 ms. As an example, W, X, Y, and Z may have values such that DRX cycle length 213 (determined based on W, X, Y, and Z) may have a value of thousands of milliseconds (e.g., 5120 ms), minutes, tens of minutes (e.g., 15, 20, or 30 minutes), or hours. Values 32, 64, 128, 256, and 512 are used as examples of the number of radio frames among DRX parameter values $T_{C1}$ through $T_{CN}$. Other values can be used.

DRX parameter values $T_{C1}$ through $T_{CN}$ may be grouped into non-extended DRX parameter values associated with non-extended values for DRX cycle length 213 and extended DRX parameter values associated with extended values for DRX cycle length 213. For example, DRX parameter values $T_{C1}$ through $T_{C4}$ (where $T_{C4}$ is a greatest value among $T_{C1}$ through $T_{C4}$) may be grouped into non-extended DRX parameter values. These non-extended DRX parameter values (e.g., $T_{C1}$ through $T_{C4}$) may be used as non-extended default DRX parameter values supported by the eNB 102. The value of DRX cycle length 213 determined based on one of these non-extended DRX parameter values (e.g., $T_{C1}$ through $T_{C4}$) may be referred to as a non-extended DRX cycle length (non-extended default DRX cycle length). Thus, the value of DRX cycle length 213 may correspond to one of a value of a non-extended DRX cycle length a value of an extended DRX cycle length supported by eNB 102.

In another example, DRX parameter values $T_{C5}$ through $T_{CN}$ may be grouped into extended DRX parameter values. These extended DRX parameter values (e.g., $T_{C5}$ through $T_{CN}$) may be used as extended default DRX parameter values supported by the eNB 102. The value of DRX cycle length 213 determined based on one of these extended DRX parameter values (e.g., $T_{C5}$ through $T_{CN}$) may be referred to as an extended DRX cycle length (extended default DRX cycle length).

WCD 111 may use DRX cycle length 213 having a value determined based on either a non-extended DRX parameter value (e.g., one of $T_{C1}$ through $T_{C4}$) or an extended DRX parameter value (e.g., one of $T_{C5}$ through $T_{CN}$) depending in part on the type and/or capability of WCD 111. For example, if WCD 111 is a delay tolerant device (e.g., an MTC device), then WCD 111 may use DRX cycle length 213 having a value determined based on an extended DRX parameter value in order to achieve a relatively higher reduction in power in DRX mode. In another example, if WCD 111 is a non-MTC device, then WCD 111 may use DRX cycle length 213 having a value determined based on a non-extended DRX parameter value in order to maintain or achieve good user experience. In a further example, WCD 111 may have capability of using both non-extended and extended DRX cycle lengths, such that it may use a non-extended DRX cycle length at one time and an extended DRX cycle length at another time. In the examples here, a delay tolerant device (e.g., delay tolerant WCD device) may include a WCD that may use a DRX cycle length having a value determined based on a DRX parameter value (e.g., one of $T_{C5}$ through $T_{CN}$) that is greater than at least four DRX parameter values (e.g., $T_{C1}$ through $T_{C4}$) among DRX parameter values (e.g., $T_{C5}$ through $T_{CN}$) associated with values of DRX cycle lengths supported by the eNB (e.g., eNB 102). Thus, if DRX parameter value $T_{C4}$ is the greatest value among DRX parameter values $T_{C1}$ through $T_{C4}$ and if $T_{C4}$ is not greater than 256 radio frames (e.g., corresponding to a DRX cycle length having a value of not greater than 2560 ms), then a delay tolerant device in this example may include a WCD that is capable of using a DRX cycle length having a value of greater than 2560 ms. The values of 256 radio frames and 2560 ms are used herein as an example. Other values may be used.

In the above description, the value of DRX cycle length 213 may be determined based on a DRX parameter value specified by the eNB 102 (eNB specified DRX parameter value). Alternatively (or additionally), the value of DRX cycle length 213 may be determined based on a DRX parameter value specified by WCD 111 (device specified DRX parameter value). For example, instead of determining the value of DRX cycle length 213 based on a DRX parameter value (e.g., one of $T_{C1}$ through $T_{CN}$) specified by the eNB 102, WCD 111 may determine the value of DRX cycle length 213 based on a DRX parameter value $T_{DEV}$ specified by WCD 111. DRX parameter value $T_{DEV}$ specified by WCD 111 may be equal to one of the DRX parameter values specified by the eNB 102. For example, DRX parameter value $T_{DEV}$ may be equal to one of DRX parameter value $T_{C5}$ through $T_{CN}$. DRX parameter value $T_{DEV}$ may be at most equal to the maximum value (e.g., $T_{CN}$) among DRX parameter values (e.g., $T_1$ through $T_{CN}$) supported by the eNB 102. This may allow a proper communication between WCD 111 and the eNB 102.

DRX parameter value $T_{DEV}$ may be a non-extended device specified DRX parameter value or an extended device specified DRX parameter value. For example, if DRX parameter value $T_{DEV}$ is in a range from DRX parameter value $T_{C1}$ to DRX parameter value $T_{C4}$ (e.g., $T_{DEV}$ may or may not be equal to one of $T_{C1}$ through $T_{C4}$), then DRX parameter value $T_{DEV}$ may be referred to as a non-extended device specified DRX parameter value. In another example, if DRX parameter value $T_{DEV}$ is in a range from DRX parameter value $T_{C5}$ to DRX parameter value $T_{CN}$ (e.g., $T_{DEV}$ may or may not be equal to one of $T_{C5}$ through $T_{CN}$), then DRX parameter value $T_{DEV}$ may be referred to as an extended device specified DRX parameter value.

The value for DRX cycle length 213 determined based on DRX parameter value $T_{DEV}$ may be a non-extended DRX cycle length or an extended DRX cycle length. For example, the value for DRX cycle length 213 may be a non-extended DRX cycle length if it is determined based on a non-extended device specified DRX parameter value. In another example, the value for DRX cycle length 213 may be an extended DRX cycle length if it is determined based on an extended device specified DRX parameter value.

The value of DRX cycle length 213 may be determined in accordance to the 3GPP-LTE standards. For example, the value of DRX cycle length 213 may be determined based on a lesser (e.g., minimum) of a device specified DRX parameter value (e.g., $T_{DEV}$) and the eNB specified DRX parameter value (e.g., one of $T_{C1}$ through $T_{CN}$).

Supporting a relatively larger number (e.g., $T_{C1}$ through $T_{CN}$ where N >4) of DRX parameter values and relatively higher DRX parameter values (e.g., $T_{C5}$ through $T_{CN}$), as described above, may allow the eNB 102 (or MME 101) to provide both a relatively higher power savings (e.g., optimal power savings) for some WCDs (e.g., delay tolerant devices such as MTC devices) and good user experience for some other WCDs (e.g., non-MTC devices) operating in wireless communication network 100. For example, if the eNB 102 supports only a limited number (e.g., $T_{C1}$) through $T_{CN}$ where N≤4) of default DRX parameter values associated with a maximum DRX cycle length of 2560 ms, then WCD 111 (e.g., a MTC device) may not achieve a relatively higher power savings (e.g., optimal power savings) in DRX mode if WCD 111 is capable of using a DRX cycle length greater than 2560 ms. However, for the same WCD 111, if the eNB 102 supports a relatively large number (e.g., $T_{C1}$ through $T_{CN}$ where N>4) of DRX parameter values associated with DRX cycle lengths having values greater than 2560 ms, then WCD 111 may achieve a relatively higher power savings in DRX mode when WCD 111 uses DRX cycle length 213 having values greater than 2560 ms. In this example (e.g., $T_{C1}$ through $T_{CN}$ where N>4), the eNB 102 may still use DRX parameter values (e.g., $T_{C1}$ through $T_{C4}$) for other WCDs (e.g., non-MTC devices) and allow them to use a lower value for DRX cycle length 213 (e.g., 2560 ms or less) in order to maintain or achieve good user experience.

Figure 3:
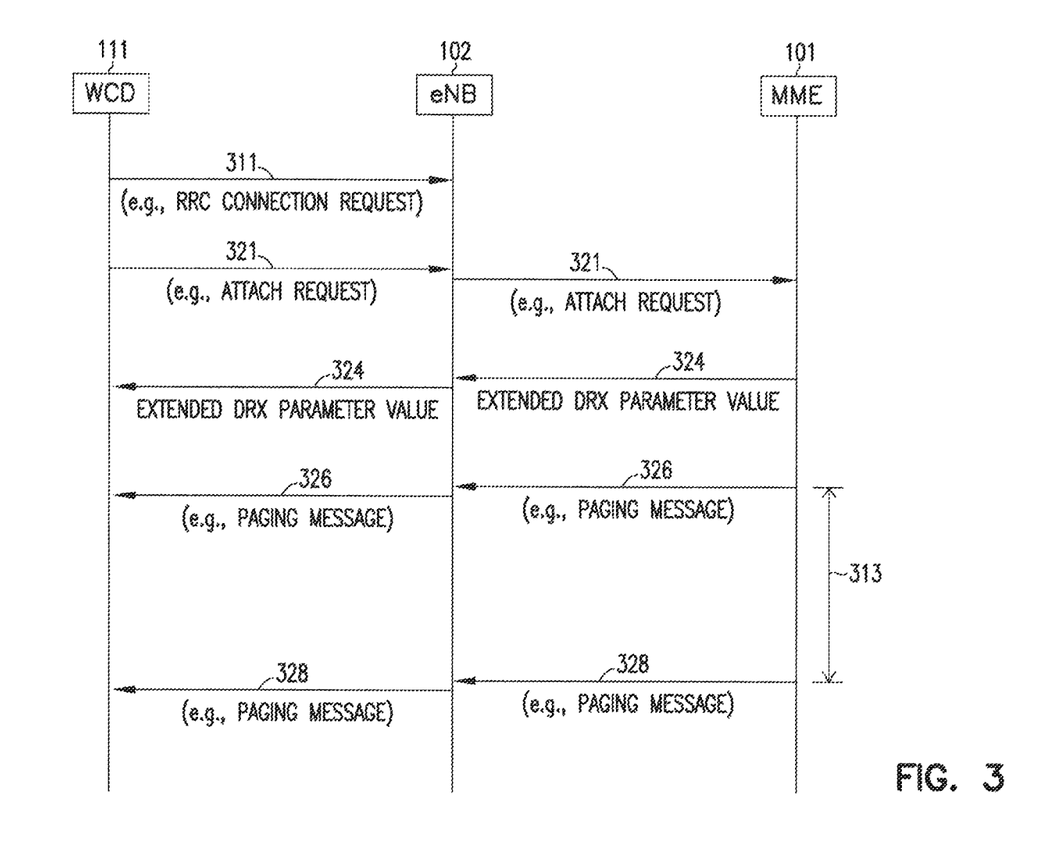
FIG. 3 shows an example communication among the MME, the eNB, and one of the wireless communication devices of FIG. 1, according to some embodiments described herein.

FIG. 3 shows an example communication among MME 101, the eNB 102, and WCD 111, according to some embodiments described herein. The communication shown in FIG. 3 may include messages (e.g., in the form of radio frequency (RF) signals), such as messages 311, 321, 324, 326, and 328.

WCD 111 may send message 311 to the eNB 102. Message 311 may include information to request establishing a communication link (e.g., radio connection) between WCD 111 and the eNB 102. For example, message 311 may include RRC Connection Request message in accordance to the 3GPP-LTE standards. Thus, message 311 may include information identifying device identity and an RRC establishment cause in accordance to the 3GPP-LTE standards. In the example associated with FIG. 3, WCD 111 may include a delay tolerant device. Thus, the establishment cause included in message 311 sent by WCD 111 may include a delay tolerant establishment cause. The eNB 102 may re-establish an appropriate communication link with WCD 111 based on at least in part the delay tolerant establishment cause indicated by WDC 111. For example, based on the delay tolerant establishment cause indicated by WDC 111, MME 101 and the eNB 102 may provide (e.g., send) an extended (e.g., default) DRX parameter value (e.g., one of $T_{C5}$ through $T_{CN}$) associated with an extended (e.g., default) DRX cycle length to WDC 111 for use in DRX mode.

WCD 111 may also send message 321 to eNB 102. Message 321 may be sent after message 311 is sent in order to complete a communication link between WCD 111 and the eNB 102. Message 321 may include information indicating device capability of WCD 111. Message 321 may include an Attach Request message in accordance to the 3GPP-LTE standards.

The eNB 102 may send message 324 to WCD 111. Message 324 may be initiated by MME 101. Message 324 may include a system information broadcast (SIB) message in accordance to the 3GPP-LTE standards. Message 324 may include an eNB specified DRX parameter value associated DRX cycle length (e.g., DRX cycle length 213 in FIG. 2). For example, message 324 may include one of DRX parameter values $T_{C1}$ through $T_{CN}$ (e.g., a default DRX parameter value) described above with reference to FIG. 2. Thus, message 324 may include an extended default DRX parameter value (e.g., one of $T_{C5}$ through $T_{CN}$). WCD 111 may use the DRX parameter value (e.g., one of $T_{C5}$ through $T_{CN}$) provided by eNB 102 to determine (e.g., calculate) the DRX parameters (e.g., on-duration 211 and off-duration 212 in FIG. 2) in order to determine when to wake up to monitor control channel during DRX mode. For example, WCD 111 may use the DRX parameter value included in message 324 to calculate specific radio frame (e.g., paging frame (PF)) and specific sub-radio frame (e.g., paging opportunity (PO)) of a paging message in DRX mode sent by eNB 102 (initiated by MME 101) in accordance to the 3GPP-LTE standards. WCD 111 may enter DRX mode in RRC idle state at some time after message 324 is sent to WCD 111 and before message 326 is sent to WCD 111.

The eNB 102 may send messages 326 and 328 to WCD 111 while WCD 111 is in RRC idle state (FIG. 2). Information included in messages 326 and 328 may include incoming communication (e.g., incoming phone calls), system information (e.g., updates), natural emergency events (e.g., earthquake, hurricanes, tsunami or other emergency events), or other information. Each of massages 326 and 328 may include paging messages in accordance to the 3GPP-LTE standards. As shown in FIG. 3, messages 326 and 328 may be sent at a time interval (e.g., paging cycle) 313. The value of time interval 313 may be equal to the value of DRX cycle length 213 used by WCD 111. The value of time interval 313 may be determined based on a DRX parameter value associated with DRX cycle length included in message 324. For example, if message 324 includes a DRX parameter value associated with DRX cycle length of 5120 ms (e.g., based on $T_{C5}$=512 radio frames, with 10 ms for each radio frame), then time interval 313 is 5120 ms. In this example, WCD 111 may wake up at every 5120 ms in DRX mode in RRC idle state to monitor the control channel (e.g., PDCCH) in order to determine whether it is paged by the network (e.g., paged by MME 101 through eNB 102). FIG. 3 shows two messages 326 and 328 as an example. A different number of messages (e.g., paging messages) may be used.

In FIG. 3, if WCD 111 detects the presence of message 326 (or 328), then it may take another action (e.g., decode a portion of message 326) to determine whether message 326 is intended for it. If WCD 111 determines that message 326 is not intended for it, then WCD 111 may return to an asleep stage (e.g., in off-duration 212 in FIG. 2). WCD 111 may wake up during the next on-duration 211 (FIG. 2) to repeat the monitoring function. If WCD 111 determines that message 326 is intended for it, then WCD 111 may perform further actions (e.g., respond to the paging message) based on information included in the detected paging messaged.

Communication among WCD 112, the eNB 102, and MME 101 may be similar to, or identical to, that shown in FIG. 3. However, a DRX parameter value associated with DRX cycle length sent to WCD 112 may be different from DRX parameter value associated with DRX cycle length sent to WCD 111. For example, if WCD 111 is a delay tolerant device (e.g., an MTC device) and WCD 112 is not a delay tolerant device (e.g., a non-MTC device), then the DRX parameter value (e.g., one of $T_{C5}$ through $T_{CN}$) sent to WCD 111 may be greater than the DRX parameter value (e.g., one of $T_{C1}$ through $T_{C4}$) sent to WCD 112. Thus, in this example, WCD 111 may use a greater value for DRX cycle length than that of WCD 112. In this example, the eNB 102 may send paging messages (initiated by MME 101) to WCDs 111 and 112 at different time intervals. For example, the eNB 102 may send paging messages to WCD 111 at time interval 313 based on the DRX parameter value associated with the DRX cycle length used by WCD 111. The eNB 102 may send paging messages to WCD 112 at another time interval (e.g., less than time interval 313) based on the DRX parameter value associated with the DRX cycle length used by WCD 112.

Figure 4:
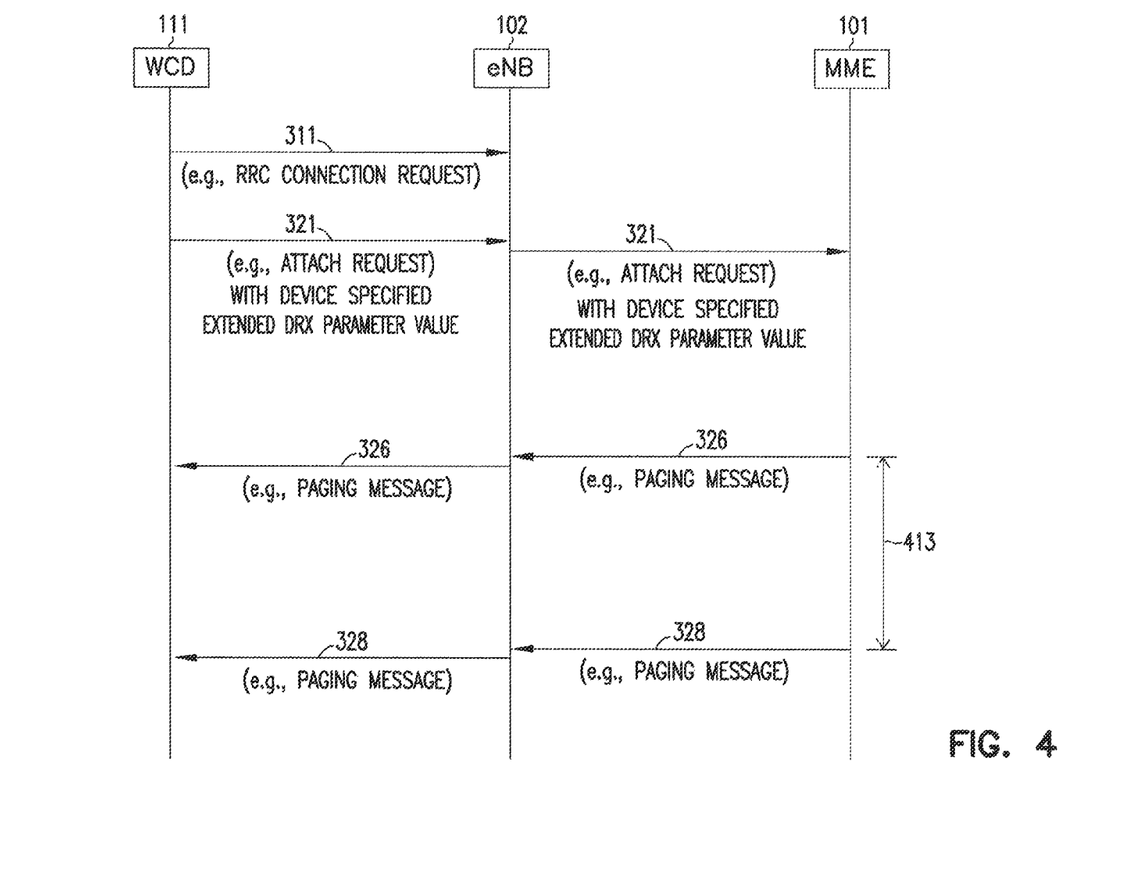
FIG. 4 shows another example communication among the MME, the eNB, and one of the wireless communication devices of FIG. 1, according to some embodiments described herein.

FIG. 4 shows another example communication among MME 101, the eNB 102, and WCD 111, according to some embodiments described herein. The communication associated with FIG. 4 is similar to that of the communication associated with FIG. 3. Thus, the description of similar elements between FIG. 3 and FIG. 4 is not repeated in the description of FIG. 4. Differences between the communications associated with FIG. 3 and FIG. 4 include different values of time interval 313 (FIG. 3) and time interval 413 (FIG. 4). The value of time interval 413 may be equal to the value of DRX cycle length 213 used by WCD 111. As described above, the value of time interval 313 (FIG. 3) may be determined based on the eNB (e.g., eNB 102) specified DRX parameter value (e.g., a default DRX parameter value supported by the eNB). In FIG. 4, the value of time interval (e.g., paging cycle) 413 may be determined based on a device (e.g., WCD 111) specified DRX parameter value (e.g., $T_{DEV}$), as described below.

For example, in FIG. 4, message 321 (e.g., Attach Request message) sent by WCD 111 to the eNB 102 may include a DRX parameter value $T_{DEV}$ associated with DRX cycle length 213 (FIG. 2) that WCD 111 prefers to use during DRX mode in RRC idle state. As described above with reference to FIG. 2, DRX parameter value $T_{DEV}$ may be in a range from DRX parameter value $T_{C5}$ to DRX parameter value $T_{CN}$ (e.g., $T_{DEV}$ may or may not be equal to one of $T_{C5}$ through $T_{CN}$) supported by the eNB 102. MME 101 may store the device specified DRX parameter value (e.g., $T_{DEV}$) and use it to determine the value for time interval 413 and the value for DRX cycle length used by WCD 111. If there is a DRX parameter value (e.g., old value) associated with DRX cycle length 213, MME 101 may replace such a value (e.g., old value) with (e.g., a new value) indicated by device specified DRX parameter value (e.g., $T_{DEV}$). Thus, in the example in FIG. 4, messages (e.g., paging messages) 326 and 328 may be sent to WCD 111 at time interval 413 having a value based on the DRX parameter value provided by WCD 111.

In the communication associated with FIG. 4, WCD 111 may monitor control channel while it is in DRX mode and may respond to messages 326 and 328 in a fashion similar to, or identical to, that described above with reference to FIG. 3.

Communication among WCD 112, the eNB 102, and MME 101 may be similar to, or identical to, that shown in FIG. 4. However, a DRX parameter value associated with DRX cycle length specified by WCD 112 may be different from the DRX parameter value associated with DRX cycle length specified by WCD 111. For example, if WCD 111 is a delay tolerant device (e.g., an MTC device) and WCD 112 is not a delay tolerant device (e.g., a non-MTC device), then the DRX parameter value (e.g., $T_{DEV}$ from WCD 111) associated with DRX cycle length sent to the eNB 102 by WCD 111 may be greater than the DRX parameter value (e.g., $T_{DEV}$ from WCD 112) associated with DRX cycle length sent to eNB 102 by WCD 112. Thus, in this example, WCD 111 may use a greater value for DRX cycle length (e.g., DRX cycle length 213) than that of WCD 112. In this example, the eNB 102 may send paging messages (initiated by MME 101) to WCDs 111 and 112 at different time intervals. For example, the eNB 102 may send paging messages to WCD 111 at time interval 413 based on the DRX parameter value associated with DRX cycle length specified by WCD 111. The eNB 102 may send paging messages to WCD 112 at another time interval (e.g., less than time interval 413) based on the DRX parameter value associated with DRX cycle length specified by WCD 112.

In FIG. 3 and FIG. 4, any combination of DRX parameter values may be used to determine the value of DRX cycle length 213 for each of WCD 111 and WCD 112.

For example, WCD 111 may determine the value of DRX cycle length 213 for use in its DRX mode based on a non-extended default eNB specified DRX parameter value (e.g., one of $T_{C1}$ through $T_{C4}$) and WCD 112 may determine the value of DRX cycle length 213 for use in its DRX mode based on a non-extended default eNB specified DRX parameter value (e.g., one of $T_{C1}$ through $T_{C4}$). In this example, each of WCD 111 and WCD 112 may include a non-MTC device.

In another example, WCD 111 may determine the value of DRX cycle length 213 for use in its DRX mode based on an extended default eNB specified DRX parameter value (e.g., one of $T_{C5}$ through $T_{CN}$) and WCD 112 may determine the value of DRX cycle length 213 for use in its DRX mode based on an extended default eNB specified DRX parameter value (e.g., one of $T_{C5}$ through $T_{C5}$). In this example, each of WCD 111 and WCD 112 may include a delay tolerant device (e.g., a MTC device).

In another example, WCD 111 may determine the value of DRX cycle length 213 for use in its DRX mode based on a non-extended default eNB specified DRX parameter value (e.g., one of $T_{C1}$ through $T_{C4}$) and WCD 112 may determine the value of DRX cycle length 213 for use in its DRX mode based on an extended default eNB specified DRX parameter value (e.g., one of $T_{C5}$ through $T_{C5}$). In this example, WCD 111 may include a non-MTC device and WCD 112 may include a delay tolerant device (e.g., a MTC device).

In another example, WCD 111 may determine the value of DRX cycle length 213 for use in its DRX mode based on a device (e.g., WCD 111) specified DRX parameter value (e.g., either a non-extended $T_{DEV}$ or extended $T_{DEV}$) and WCD 112 may determine the value of DRX cycle length 213 for use in its DRX mode based on a device (e.g., WCD 112) specified DRX parameter value (e.g., either a non-extended $T_{DEV}$ or extended $T_{DEV}$). In this example, WCD 111 may include either non-MTC device or a delay tolerant device and WCD 112 may include either a non-MTC device or a delay tolerant device.

In another example, WCD 111 may determine the value of DRX cycle length 213 for use in its DRX mode based on a non-extended default eNB specified DRX parameter value (e.g., one of $T_{C1}$ through $T_{C4}$) and WCD 112 may determine the value of DRX cycle length 213 for use in its DRX mode based on a device (e.g., WCD 112) specified DRX parameter value (e.g., either a non-extended $T_{DEV}$ or extended $T_{DEV}$). In this example, WCD 111 may include a non-MTC device and WCD 112 may include either a non-MTC device or a delay tolerant device.

The techniques described herein may improve power consumption for some WCDs (e.g., delay tolerant devices such as MTC devices) and also maintain and/or improve good user experience for some other WCDs (e.g., non-MTC devices). For example, the techniques described herein may allow some WCDs (e.g., MTC devices) to use a value (e.g., extended value) for DRX cycle length (e.g., based on one of $T_{C1}$ through $T_{C4}$) in DRX mode in order to achieve a higher reduction in power consumption. The techniques described herein may also allow some other WCDs (e.g., non-MTC devices) to use another value (e.g., non-extended value) for DRX cycle length (e.g., based on one of $T_{C5}$ through $T_{CN}$) in DRX mode in order to maintain and/or improve good user experience.

Figure 5:
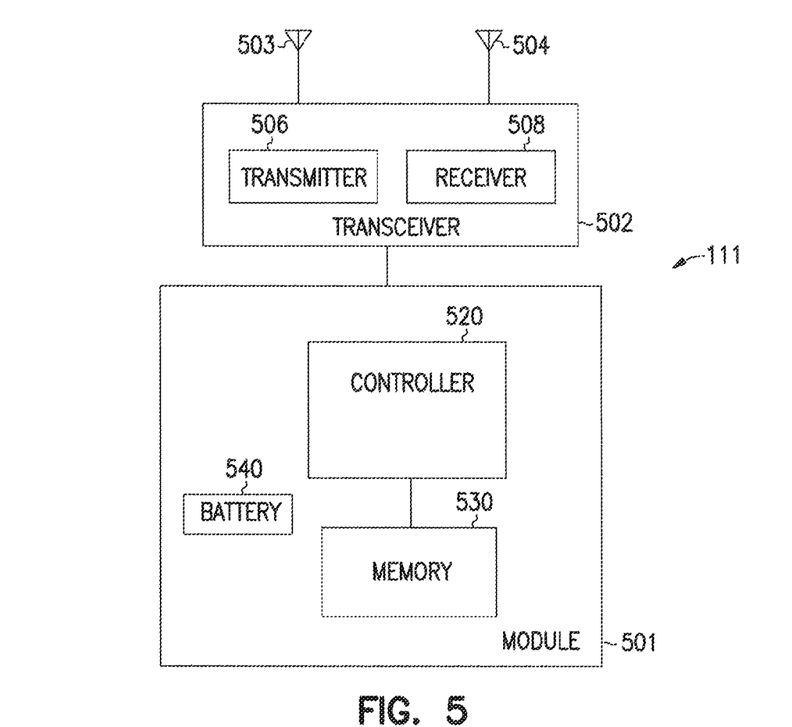
FIG. 5 shows an example block diagram of one of the wireless communication devices of FIG. 1, according to some embodiments described herein.

FIG. 5 shows an example block diagram of WCD 111, according to some embodiments described herein. WCD 112 (not show in FIG. 5) may include components similar to, or identical to, the components of WCD 111. As shown in FIG. 5, WCD 111 may include a module 501, a transceiver 502, and antennas 503 and 504. Transceiver 502 may include a transmitter 506 and a receiver 508. Module 501 may include a controller 520, a memory 530, and a battery 540. For simplicity, FIG. 5 omits other elements of WCD 111, such as one or more of a keyboard, a display (e.g., an LCD screen including a touch screen), a non-volatile memory port (e.g., a Universal Serial Bus (USB) port), speakers, and other elements.

Module 501 and transceiver 502 may be arranged (e.g., configured) to perform operations described above with reference to FIG. 1 through FIG. 5. For example, module 501 may cause WCD 111 to enter DRX mode in an operational state of WCD 111. The operational state may include RRR connected state or RRC idle state. In DRX mode (e.g., DRX mode in RRC idle state in FIG. 2), module 501 may monitor OFDMA frames of PDCCH during the on-duration 211 (FIG. 2) and refrain from monitoring (e.g., does not monitor) OFDMA frames of PDCCH during off-duration 212 (FIG. 2).

Module 501 may determine a DRX parameter value associated with a DRX cycle length of DRX cycle in DRX mode. The DRX parameter value may be based on an eNB (e.g., eNB 102) specified DRX parameter value (e.g., one of $T_{C5}$ through $T_{CN}$). Thus, the value of the DRX cycle length may be determined based on an eNB specified DRX parameter value. Alternatively, the DRX parameter value may be based on a device (e.g., WCD 111) specified DRX parameter value (e.g., $T_{DEV}$). Thus, the value of the DRX cycle length may be determined based on a device specified DRX parameter value. The DRX parameter value (either eNB specified DRX parameter value or device specified DRX parameter value) may be greater than at least four DRX parameter values (e.g., greater than each of $T_{C1}$, $T_{C2}$, $T_{C3}$, and $T_{C4}$) among DRX parameter values (e.g., $T_{C1}$ through $T_{CN}$) associated with values of DRX cycle lengths supported by the eNB (e.g., eNB 102). Thus, module 501 may cause WCD 111 to enter DRX mode with a DRX cycle, in which the DRX cycle may include a DRX cycle length (e.g., extended DRX cycle length) having a value greater than at least four values of DRX cycle lengths (e.g., four values determined based on corresponding DRX parameter values $T_{C1}$, $T_{C2}$, $T_{C3}$, and $T_{C4}$) supported by the eNB. As described above with reference to FIG. 1 through FIG. 4, WCD 111 may use an extended DRX cycle length in DRX mode to reduce power consumption of WCD 111. Thus, the life of battery 540 may be lengthened.

Transmitter 506 may receive uplink receptions and transmit downlink transmissions between WCD 111 and the eNB 102. For example, transmitter 506 may be arranged to send one or more messages (e.g., through antenna 503), such as messages 311 and 321 (FIG. 3 and FIG. 4) to the eNB 102. Receiver 508 may be arranged to receive one or more messages from the eNB 102 (e.g., through antenna 504), such as messages 324, 326, and 328 (FIG. 3 and FIG. 4).

Controller 520 of module 501 may include one or more processors that may include one or more central processing units (CPUs), graphics processing units (GPUs), or both. Controller 520 may be arranged (e.g., configured) to provide processing and control functionalities for WCD 111. Memory 530 may include volatile memory, non-volatile memory, or a combination of both. Memory 530 may store instructions (e.g., firmware programs, software programs, or a combination of both). Controller 520 may execute instructions in memory 530 to result in WCD 111 performing operations, such as operations in WCD 111 described above with reference to FIG. 1 through FIG. 4.

Antennas 503 and 504 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. Antenna 503 and 504 may be arranged to support multiple-input and multiple-output (MIMO) communications. In some MIMO embodiments, antennas 503 and 504 may be effectively separated to benefit from spatial diversity and the different channel characteristics that may result between each of antennas 503 and 504 and the antennas of a transmitting station. In some MIMO embodiments, the antennas 503 and 504 may be separated by up to 1/10 of a wavelength or more.

FIG. 5 shows an example where WCD 111 includes one transceiver (e.g., 502) and two antennas (e.g., 503 and 504). The number of transceivers and antennas may vary. Module 501 and transceiver 502 may be arranged to operate in different communication networks, such as a 3GPP-LTE network, a WiMax network, and other networks.

Although WCD 111 is shown as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions (e.g., firmware programs, software programs, or a combination of both) stored on a computer-readable storage medium, which may be read and executed by at least one processor to perform the operations described herein. A computer-readable storage medium may include any non-transitory mechanism (e.g., non-transitory computer-readable medium) for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the WCD 111 may be configured with the instructions to perform the operations described herein.

ADDITIONAL NOTES AND EXAMPLES

Example 1 includes subject matter (such as a device, apparatus, or machine) including a wireless communication device (WCD) comprising a module to cause the wireless communication device to enter a discontinuous reception (DRX) mode in an operational state of the wireless communication device, the DRX mode including a DRX cycle, the DRX cycle having an DRX cycle length. The DRX cycle length may have a value greater than at least four values of DRX cycle lengths supported by an enhanced node-B (eNB).

In Example 2, the subject matter of Example 1 may optionally include a receiver to receive a DRX parameter value from the eNB, wherein the value of the DRX cycle length is determined based on the DRX parameter value from the eNB.

In Example 3, the subject matter of Example 1 may optionally include a transmitter to send a device specified DRX parameter value to the eNB, wherein the value of DRX cycle length is determined based on the device specified DRX parameter value.

In Example 4, the subject matter of Example 1 may optionally include, wherein the module is arranged to monitor orthogonal frequency division multiple access (OFDMA) frames of a physical downlink control channel (PDCCH) during a portion of the DRX cycle.

In Example 5, the subject matter of any one or more of Example 1 to Example 4 may optionally include, wherein the module is arranged to refrain from monitoring OFDMA frames of PDCCH during another portion of the DRX cycle.

In Example 6, the subject matter of Example 1 may optionally include, wherein the value of the DRX cycle length is greater than 2560 milliseconds.

In Example 7, the subject matter of Example 1 may optionally include, wherein the operational state includes a radio resource control (RRC) idle state.

In Example 8, the subject matter of Example 1 may optionally include, wherein the operational state includes a radio resource control (RRC) connected state.

In Example 9, the subject matter of Example 1 may optionally include, wherein the wireless communication device includes a delay tolerant device.

In Example 10, the subject matter of Example 1 may optionally include, wherein the module includes a processor.

Example 11 includes or may optionally be combined with the subject matter of any one of Examples 1-10 to include subject matter (such as a device, apparatus, or machine) including a wireless communication device (WCD) arranged to determine a discontinuous reception (DRX) parameter value associated with a DRX cycle length of a DRX cycle, wherein the DRX parameter value is greater than at least four DRX parameter values among a plurality of DRX parameter values, the plurality of DRX parameter values being associated with DRX cycle lengths supported by an enhanced node-B (eNB); and enter a DRX mode in an operational state, wherein the DRX mode includes the DRX cycle.

In Example 12, the subject matter of Example 11 may optionally include, wherein the plurality of DRX parameter values supported by the eNB includes default DRX parameter values, and the DRX parameter value associated with the DRX cycle length is one of the default DRX parameter values.

In Example 13, the subject matter of Example 11 may optionally include, wherein the DRX parameter value indicates a number of radio frames in the DRX cycle.

In Example 14, the subject matter of Example 11 may optionally include, wherein a greatest value among the at least four DRX parameter values is not greater than 256 radio frames.

In Example 15, the subject matter of Example 11 may optionally include, wherein the wireless communication device includes a machine-type communication device.

Example 16 includes subject matter including an enhanced Node-B (eNB) arranged to determine a discontinuous reception (DRX) parameter value associated with a DRX cycle length of a DRX cycle, wherein the DRX parameter value is associated with an extended DRX cycle length; and send the DRX parameter value to a delay tolerant wireless communication device.

In Example 17, the subject matter of Example 16 may optionally include, determine an additional DRX parameter value associated with a non-extended DRX cycle length; and send the additional DRX parameter value to an additional wireless communication device.

In Example 18, the subject matter of any one or more of Example 16 to Example 17 may optionally include, wherein the DRX parameter value is greater than 256 radio frames.

In Example 19, the subject matter of any one or more of Example 16 to Example 18 may optionally include, wherein the additional DRX parameter value is less than 256 radio frames.

In Example 20, the subject matter of any one or more of Example 16 to 17 may optionally include, further arranged to send a first paging message to the delay tolerant wireless communication device at a first time interval based on the DRX parameter value; and send a second paging message to the additional wireless communication device at a second first time interval based on the additional DRX parameter value.

In Example 21, the subject matter of any one or more of Example 16 to Example 20 may optionally include, wherein the DRX parameter value includes a first default DRX parameter value supported by the eNB, and the additional DRX parameter value includes a second default DRX parameter value supported by the eNB.

In Example 22, the subject matter of Example 16 may optionally include, wherein the eNB is arranged to operate in a long term evolution (LTE) network.

Example 23 includes or may optionally be combined with the subject matter of any one of Examples 1-22 to include subject matter (such as a method, means for performing acts) comprising entering a discontinuous reception (DRX) mode in an operational state of the wireless communication device, the wireless communication device including a delay tolerant device; and monitoring a control channel during at least a portion of a DRX cycle in the DRX mode, the DRX cycle having a DRX cycle length, wherein the DRX cycle length has a value corresponding to one of a value of non-extended DRX cycle length and a value of an extended DRX cycle length supported by an enhanced Node-B (eNB).

In Example 24, the subject matter of Example 23 may optionally include, receiving a default DRX parameter value from the eNB; and determining the DRX cycle length based on the default DRX parameter value.

In Example 25, the subject matter of Example 23 may optionally include, further comprising sending a device specified DRX parameter value to the eNB; and determining the DRX cycle length based on the device specified DRX parameter value.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising:
a transmitter to communicate with an enhanced Node-B (eNB); and
a module coupled to the transmitter, the module including a controller and a memory to cause the wireless communication device to enter a discontinuous reception (DRX) mode in an operational state of the wireless communication device, the DRX mode including a DRX cycle, the DRX cycle having a DRX cycle length,
wherein a value of the DRX cycle length is determined based on one of a device specified DRX parameter value or an eNB specified DRX parameter value, and the value of the DRX cycle length is dependent on whether the wireless communication device is a machine type communication (MTC) device, the MTC device configurable for extended DRX cycle lengths and tolerant of delays longer than a maximum DRX cycle length that is tolerated by a non-MTC device,
wherein the device specified DRX parameter value is selected from a plurality of DRX parameter values separated into a non-extended DRX parameter group that comprises non-extended DRX parameter values associated with non-extended values for a non-extended DRX cycle length and an extended DRX parameter group that comprises extended DRX parameter values associated with extended values for an extended length DRX cycle length,
wherein for the eNB specified DRX parameter value, the transmitter is configured to receive from the eNB a system information block (SIB) other than SIB2, on which default DRX values are broadcast, the SIB dedicated to delay tolerant devices and comprising default DRX cycle lengths, the SIB comprising a longDRX-CycleStartOffset information element (IE) selected from values including subframe (sf)5120 and sf10240 and a defaultPagingCycle IE selected from values including radio frame (rf)512 and rf1024 in response to an indication from the wireless communication device to the eNB that the wireless communication device is an MTC device, and
wherein the transmitter is configured to provide to the eNB the device specified DRX parameter value in an attach request.

2. The wireless communication device of claim 1, wherein the module is arranged to monitor orthogonal frequency division multiple access (OFDMA) frames of a physical downlink control channel (PDCCH) during a portion of the DRX cycle.

3. The wireless communication device of claim 2, wherein the module is arranged to refrain from monitoring OFDMA frames of PDCCH during another portion of the DRX cycle.

4. The wireless communication device of claim 1, wherein the value of the DRX cycle length is greater than 2560 milliseconds.

5. The wireless communication device of claim 1, wherein the operational state includes a radio resource control (RRC) idle state.

6. The wireless communication device of claim 1, wherein the operational state includes a radio resource control (RRC) connected state.

7. The wireless communication device of claim 1, wherein the wireless communication device includes a delay tolerant device.

8. The wireless communication device of claim 1, wherein the module includes a processor.

9. A wireless communication device comprising:
a transmitter to send a device specified DRX parameter value to an enhanced node-B (eNB); and
a module coupled to the transmitter, the module including a controller and a memory to determine a discontinuous reception (DRX) parameter value associated with a DRX cycle length of a DRX cycle, and to enter a DRX mode in an operational state, wherein the DRX mode includes the DRX cycle, wherein a value of the DRX cycle length is determined based on the device specified DRX parameter value, the value of the DRX cycle length is dependent on whether the wireless communication device is a machine type communication (MTC) device, the MTC device configurable for extended DRX cycle lengths and tolerant of delays longer than a maximum DRX cycle length that is tolerated by a non-MTC device, and the DRX parameter value is greater than at least four DRX parameter values among a plurality of DRX parameter values, the plurality of DRX parameter values being associated with DRX cycle lengths supported by the eNB,
wherein the DRX parameter value is selected from a plurality of DRX parameter values separated into a non-extended DRX parameter group that comprises non-extended DRX parameter values associated with non-extended values for a non-extended DRX cycle length and an extended DRX parameter group that comprises extended DRX parameter values associated with extended values for an extended length DRX cycle length,
wherein for the eNB specified DRX parameter value, the transmitter is configured to receive from the eNB a system information block (SIB) other than SIB2, on which default DRX values are broadcast, the SIB dedicated to delay tolerant devices and comprising default DRX cycle lengths, the SIB comprising a longDRX-CycleStartOffset information element (IE) selected from values including subframe (sf)5120 and sf10240 and a defaultPagingCycle IE selected from values including radio frame (rf)512 and rf1024 in response to an indication from the wireless communication device to the eNB that the wireless communication device is an MTC device, and
wherein the transmitter is configured to provide to the eNB the device specified DRX parameter value in an attach request.

10. The wireless communication device of claim 9, wherein the plurality of DRX parameter values supported by the eNB includes default DRX parameter values, and the DRX parameter value associated with the DRX cycle length is one of the default DRX parameter values.

11. The wireless communication device of claim 9, wherein the DRX parameter value indicates a number of radio frames in the DRX cycle.

12. The wireless communication device of claim 9, wherein a greatest value among the at least four DRX parameter values is not greater than 256 radio frames.

13. The wireless communication device of claim 9, wherein the wireless communication device includes a machine-type communication device.

14. A method performed by an enhanced Node-B (eNB), the method comprising:
determining a discontinuous reception (DRX) parameter value associated with a DRX cycle length of a DRX cycle, wherein the DRX parameter value is associated with an extended DRX cycle length; and
sending the DRX parameter value to a delay tolerant wireless communication device, wherein a value of the DRX cycle length is determined based on a device specified DRX parameter value sent to the eNB by the delay tolerant wireless communication device and dependent on whether the wireless communication device is a machine type communication (MTC) device, the MTC device configurable for extended DRX cycle lengths and tolerant of delays longer than a maximum DRX cycle length that is tolerated by a non-MTC device,
wherein the device specified DRX parameter value is selected from a plurality of DRX parameter values separated into a non-extended DRX parameter group that comprises non-extended DRX parameter values associated with non-extended values for a non-extended DRX cycle length and an extended DRX parameter group that comprises extended DRX parameter values associated with extended values for an extended length DRX cycle length,
wherein for the eNB specified DRX parameter value, sending the DRX parameter value comprises transmitting a system information block (SIB) other than SIB2, on which default DRX values are broadcast, the SIB dedicated to delay tolerant devices and comprising default DRX cycle lengths, the SIB comprising a longDRX-CycleStartOffset information element (IE) selected from values including subframe (sf)5120 and sf10240 and a defaultPagingCycle IE selected from values including radio frame (rf)512 and rf1024 in response to an indication from the wireless communication device to the eNB that the wireless communication device is an MTC device, and
wherein the method further comprises receiving the device specified DRX parameter value in an attach request from the MTC device.

15. The method of claim 14, further comprising:
determining an additional DRX parameter value associated with a non-extended DRX cycle length; and sending the additional DRX parameter value to an additional wireless communication device.

16. The method of claim 15, wherein the DRX parameter value is greater than 256 radio frames.

17. The method of claim 16, wherein the additional DRX parameter value is less than 256 radio frames.

18. The method of claim 15, further comprising:
sending a first paging message to the delay tolerant wireless communication device at a first time interval based on the DRX parameter value; and
sending a second paging message to the additional wireless communication device at a second first time interval based on the additional DRX parameter value.

19. The method of claim 18, wherein the DRX parameter value includes a first default DRX parameter value supported by the eNB, and the additional DRX parameter value includes a second default DRX parameter value supported by the eNB.

20. The method of claim 14, wherein the eNB is arranged to operate in a long term evolution (LTE) network.

21. A method of operating a wireless communication device, the method comprising:
entering a discontinuous reception (DRX) mode in an operational state of the wireless communication device, the wireless communication device including a delay tolerant device;
monitoring a control channel during at least a portion of a DRX cycle in the DRX mode, the DRX cycle having a DRX cycle length, wherein the DRX cycle length has a value corresponding to one of a value of non-extended DRX cycle length and a value of an extended DRX cycle length supported by an enhanced Node-B (eNB) sending a device specified DRX parameter value to the eNB; and
determining the DRX cycle length based on the device specified DRX parameter value, the value of the DRX cycle length is dependent on whether the wireless communication device is a machine type communication (MTC) device, the MTC device configurable for extended DRX cycle lengths and tolerant of delays longer than a maximum DRX cycle length that is tolerated by a non-MTC device,
wherein the device specified DRX parameter value is selected from a plurality of DRX parameter values separated into a non-extended DRX parameter group that comprises non-extended DRX parameter values associated with non-extended values for a non-extended DRX cycle length and an extended DRX parameter group that comprises extended DRX parameter values associated with extended values for an extended length DRX cycle length, wherein for the eNB specified DRX parameter value, the method further comprises receiving from the eNB a system information block (SIB) other than SIB2, on which default DRX values are broadcast, the SIB dedicated to delay tolerant devices and comprising default DRX cycle lengths, the SIB comprising a longDRX-CycleStartOffset information element (IE) selected from values including subframe (sf)5120 and sf10240 and a defaultPagingCycle IE selected from values including radio frame (rf)512 and rf1024 in response to an indication from the wireless communication device to the eNB that the wireless communication device is an MTC device, and
wherein the method further comprises transmitting to the eNB the device specified DRX parameter value in an attach request.

22. The wireless communication device of claim 1, wherein:
the value of DRX cycle length is based on a lesser of a device specified DRX parameter value and an eNB specified DRX parameter value.

23. The wireless communication device of claim 1, wherein:
the DRX cycle length used by the wireless communication device changes between the non-extended and extended DRX cycle lengths at different times.

24. The wireless communication device of claim 1, wherein:
the transmitter is further arranged to send a delay tolerant establishment cause to the eNB during establishment of a radio resource control (RRC) connection with eNB, the delay tolerant establishment cause indicates that the wireless communication device is tolerant of an extended delay in communications with the eNB, and the delay tolerant establishment cause is free from the device specified DRX parameter value, and
in response to transmission of the delay tolerant establishment cause, the wireless communication device is to receive the eNB specified DRX parameter value from the eNB.

25. The wireless communication device of claim 24, wherein in response to transmission of the delay tolerant establishment cause, the eNB specified DRX parameter value is received in a system information broadcast (SIB) message from the eNB.

26. The wireless communication device of claim 1, wherein the transmitter is to send the device specified DRX parameter value to eNB instead of the value of the DRX cycle length being based on a DRX parameter value specified by the eNB.

* * * * *